United States Patent [19]

Mayhew

[11] Patent Number: 4,966,488
[45] Date of Patent: Oct. 30, 1990

[54] BALL RETAINER

[75] Inventor: Roger D. Mayhew, Fredonia, Wis.

[73] Assignee: Weasler Engineering, Inc., West Bend, Wis.

[21] Appl. No.: 385,942

[22] Filed: Jul. 25, 1989

Related U.S. Application Data

[63] Continuation of Ser. No. 98,151, Sep. 18, 1987, abandoned.

[51] Int. Cl.$^5$ .................. F16D 3/26; F16B 21/00
[52] U.S. Cl. ................... 403/135; 403/143; 403/326; 464/118; 464/905
[58] Field of Search ............... 403/135–137, 403/143, 141, 132, 127, 326, 316, 140; 464/146, 145, 118, 905

[56] References Cited

U.S. PATENT DOCUMENTS

| | | | |
|---|---|---|---|
| 2,987,897 | 6/1961 | Spence | 464/145 |
| 2,991,634 | 7/1961 | Daley, Jr. . | |
| 3,016,721 | 1/1962 | Davis . | |
| 3,296,833 | 1/1967 | McCarthy . | |
| 3,305,617 | 2/1967 | Dumpis | 403/132 X |
| 3,524,664 | 8/1970 | Scheublein, Jr. et al. . | |
| 3,679,248 | 7/1972 | Herbenar . | |
| 3,714,798 | 2/1973 | Macielinski | 464/146 |
| 3,862,807 | 1/1975 | Doden et al. | 403/135 |
| 4,112,709 | 9/1978 | Krude . | |
| 4,281,601 | 8/1981 | Overman | 403/326 X |
| 4,286,363 | 9/1981 | Morin . | |
| 4,318,627 | 3/1982 | Morin . | |
| 4,333,319 | 6/1982 | Bischoff . | |
| 4,504,166 | 3/1985 | Morin . | |
| 4,559,692 | 12/1985 | Morin . | |
| 4,650,363 | 3/1987 | Kehl et al. . | |
| 4,650,439 | 3/1987 | Mayhew . | |
| 4,781,662 | 11/1988 | Mayhew et al. . | |

FOREIGN PATENT DOCUMENTS 461065 10/1926 Fed. Rep. of Germany ...... 403/137

Primary Examiner—Peter M. Cuomo
Attorney, Agent, or Firm—Quarles & Brady

[57] ABSTRACT

A universal joint yoke has a ball and socket connection at one end. The ball is held in the socket with an assembly of a retainer and a hidden spring. The spring is rectangular and is compressed into an external rectangular groove of the retainer. The retainer is then inserted into a recess at the end of the socket. The retainer must be inserted past its final farthest-in position for the spring to expand into an internal rounded groove in the recess to assure a loose connection without any preload on the ball.

9 Claims, 1 Drawing Sheet

BALL RETAINER

This application is a continuation of application Ser. No. 07/098,151, filed Sept. 18, 1987, now abandoned.

BACKGROUND OF THE INVENTION

1. Field of the Invention

This invention relates to a retainer for holding a swivel ball in the socket of a universal joint yoke.

2. Discussion of the Prior Art

U.S. Pat. No. 4,650,439 discloses a centering apparatus for a constant velocity universal joint in which a pair of outer yokes are pivotally connected to a double inner housing and a centering apparatus is positioned between the outer yokes. The inner end of each yoke defines a ball socket to mate in sliding contact with a swivel ball. The swivel ball is held in the socket by a retainer ring which is threaded to the yoke. Pat. No. 4,650,439 also discloses that it may be desirable in some applications to weld or bolt the retainer ring to the yoke.

However, there were problems with threading, welding and bolting the retainer ring to the yoke. Threading the retainer ring to the yoke required that threads be formed on the yoke and on the retainer ring. It also resulted in the retainer ring having the opportunity to become loosened and possibly removed from the yoke, which could result in failure of the universal joint. Welding the retainer ring to the yoke was also a relatively difficult production process and could result in undesirable hardening of the areas of the yoke and retainer ring adjacent to the weld bead. Hardening not only could make the parts unacceptably brittle but also could result in fatigue failure as the hardened areas were subjected to many loading cycles. Bolting the retainer ring to the yoke would require a relatively great additional mass and space.

All of the retainers discussed above involved a rigid connection to the yoke. However, such a rigid connection is not desirable where a preload is not to be applied to the swivel ball by the retainer. With the threaded and welded retainers, it was possible that the retainers could inadvertently be made to apply a preload to the ball, which would result in greater friction therebetween, generating unwanted heat and accelerated wear.

SUMMARY OF THE INVENTION

A ball retainer of the invention overcomes the above problems and includes a yoke having a ball receiving cavity at one end. A spherical surface is formed in the ball receiving cavity and defines an axial direction. The ball receiving cavity has at one end an enlarged circular opening coaxial with the spherical surface, said opening being defined by a shoulder facing in the axial direction of the spherical surface. A ball retainer ring has a groove around its outside circumference to receive a retainer spring. The side of the groove away from the spherical surface is alignable with the shoulder in the ball receiving cavity and the depth of the groove allows the spring retainer to be substantially fully compressed into the groove. The retainer spring is compressed into the groove in the ball retainer ring to insert the ball retainer into the circular opening, the retainer spring expanding behind the shoulder when it clears the shoulder so that the ball retainer ring locks the ball in the ball cavity against the spherical surface.

In a preferred form, the ball retainer provides a loose connection between the retainer ring and the ball to avoid any preload on the ball. In this form, the shoulder is formed by a second groove, which the retainer spring expands out against and which captures the spring axially. Because the retainer ring must be pushed slightly past the position where the first groove clears the shoulder, and also past the farthest-in position of the spring when finally assembled, for the spring to expand behind the shoulder, the retainer ring cannot be assembled to the yoke unless the final assembly will result in a loose connection between the retainer ring and the yoke, and therefore no preload on the ball.

Preferably, the second groove has a round cross-section and the retainer spring is rectangular, so that the radially outer corners of the spring expand out against round surfaces of the second groove. The round second groove endures fatigue better than a rectangular groove and also cams the corners of the spring in opposite directions to fix the spring axially without any play in its axial position. Also, a retainer spring with a rectangular cross section is less sensitive to axial misalignment than round cross section springs.

In addition, in an especially preferred form, the first groove is rectangular. With a rectangular retainer spring, this minimizes the depth of the first groove required to compress the spring far enough into the groove to insert it into the opening of the ball receiving cavity.

It is therefore a principal object of the invention to provide an improved construction for retaining a swivel ball in a socket.

It is another object of the invention to provide such a construction particularly for a universal joint yoke.

It is another object of the invention to provide such a construction which is easy and economical to manufacture and assemble.

It is another object of the invention to provide such a construction which provides a loose connection with a retainer ring and which cannot produce a preload on the ball.

It is another object of the invention to provide such a construction which is compact and resists fatigue failure.

It is another object of the invention to provide such a construction which resists tampering.

These and other objects and advantages of the invention will become apparent from the following description and from the drawings.

DETAILED DESCRIPTION OF THE PREFERRED EMBODIMENT

Figure 1:
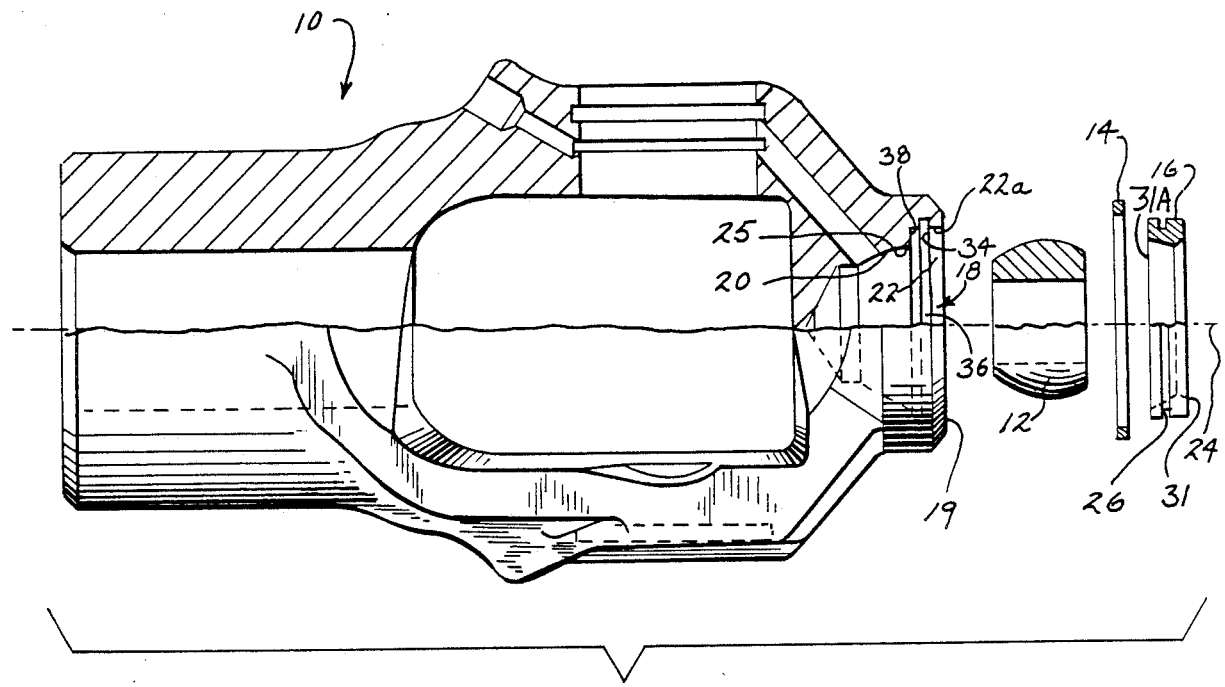
FIG. 1 is an exploded elevation view showing the parts of a ball retainer assembly of the invention.
Figure 2:
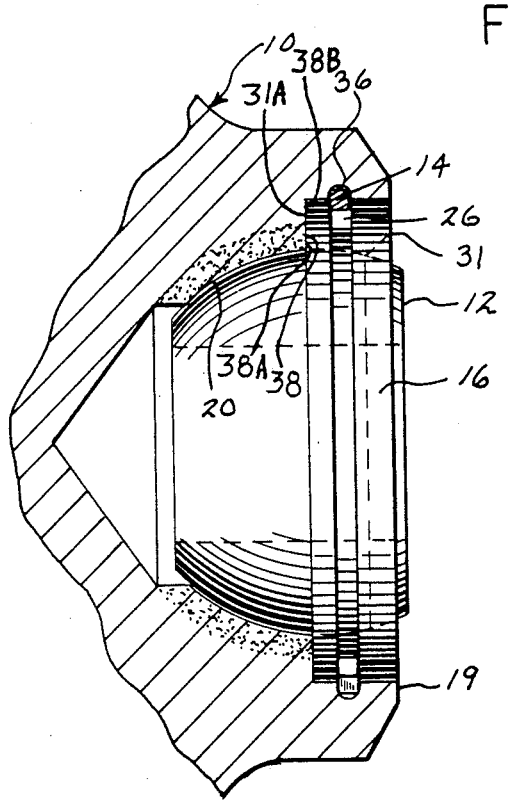
FIG. 2 is an elevation view partially in section of the ball retainer of FIG. 1 assembled.

FIG. 1 illustrates a preferred embodiment of the invention unassembled. Illustrated are a yoke 10, a swivel ball 12, a retainer spring 14, and a ball retainer ring 16. The assembly is to be used in a universal joint like that disclosed in U.S. Pat. No. 4,650,439, the disclosure of which is hereby incorporated by reference. Aspects of the yoke 10 other than those described herein are described in co-pending U.S. Patent application Ser. No. 887,484 filed July 21, 1986, now U.S. Pat. No. 4,781,662, the disclosure of which is also hereby incorporated by reference.

The yoke 10 includes a ball receiving recess 18 formed at its inner end 19. The ball receiving recess 18 includes an induction hardened spherical surface 20, indicated by stippling, to mate with the ball 12 in sliding surface contact and an enlarged circular opening 22 for receiving the retainer spring 14 and the ball retainer ring 16.

The spherical surface 20 defines an axial direction 24 and a radial direction which is in a plane normal to the axial direction 24. The surface 20 opens outwardly away from the yoke 10 in its substantially largest dimension in the radial direction at an inner end 25 so as to allow the ball 12 passage through the end 25 to seat against the spherical surface 20. The spherical surface 20 may be made so that its diameter at its inner end 25 is slightly smaller than the largest diameter of the ball 12 so that the ball 12 must be pressed or popped into mating contact with the surface 20. Once seated against the surface 20, however, the ball 12 can be freely swiveled therein. Also, the force holding the ball 12 against the surface 20 by virtue of the pop fit is not sufficient to rely upon under operating conditions to hold the ball 12 against the surface 20. Hence, even if a pop fit is used, a further retainer to lock the ball 12 against the surface 20 is required.

Figure 3:
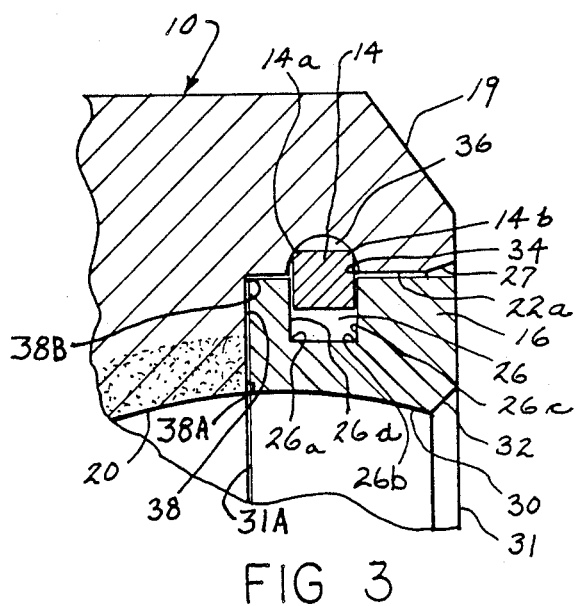
FIG. 3 is an exploded elevation view in section of a portion of the ball retainer of FIG. 2 but without the ball in place.

After the ball 12 is inserted against the surface 20, the retainer spring 14 is compressed into a groove 26 formed around the outside circumference of the retainer ring 16. The spring 14 can be compressed into the groove 26 by using a tool (not shown) having an interior conical surface to gradually compress the ring 14 into the groove 26 as the retainer ring 16 and spring 14 are together pushed axially through the tool. The diameter at the end of the tool where the spring 14 and retainer ring 16 exit should be slightly smaller than the diameter of the opening 22 so that the spring 14 and retainer ring 16 can be pushed directly from the end of the tool into the opening 22. Referring to FIG. 3, to facilitate this process, the end of the opening 22 can be chamfered as at 27.

To be able to assemble the retainer 16 in the opening 22, the outside diameter of the retainer ring 16 must be slightly smaller than the smallest inside diameter of the opening 22. The depth of the groove 26 also must be at least substantially equal to the radial thickness of the retainer spring 14 so that the spring 14 can be compressed far enough into the groove 26 for the spring 14 to be inserted into the opening 22. In the preferred embodiment, the spring 14 has a square cross section and the groove 26 has a rectangular cross section. Square corners 26a and 26b (FIG. 3) at the base of the groove allow the spring 14 to be compressed all the way into the groove 26, thereby minimizing the size of the groove 26 and ultimately the size of the entire ball retainer.

The ball retainer 16 has a second spherical surface 30 which, together with the spherical surface 20, forms a socket for the ball 12. The surface 30 is spherical to mate with the ball 12 and spread the forces therebetween over the area of surface 30. The inner end 31 of the ball retainer ring 16 is chamfered at 32 for additional support to the inner end of the surface 30. The surface 30 intersects an outer end 31A of the retainer 16 in substantially the largest dimension of the surface 30 in the radial direction (defined above).

A shoulder 34 facing in the axial direction of the spherical surface 20 is formed in the opening 22. The shoulder 34 is alignable with side 26c of groove 26 which is the side of groove 26 that is away from spherical surface 20. As retainer ring 16 with spring 14 in groove 26 is inserted in opening 22, surface 22a of opening 22 slides on the outer circumference of spring 14 to maintain spring 14 compressed in groove 26. When side 26c becomes aligned with shoulder 34, spring 14 expands radially outwardly to catch behind shoulder 34. Thereafter, forces tending to remove ring 16 from opening 22 are reacted against through side 26d of groove 26, spring 14, and shoulder 34.

Preferably, shoulder 34 is defined by a groove 36. The groove 36 has no inside corners but is rounded and nearly semicircular in cross section. For groove 36, a groove of a rectangular cross section is not desirable, because it has been found to result in possible fatigue failure of the yoke in the vicinity of the groove 36. This is particularly the case where portions of the ball receiving cavity 18 are surface hardened, as is surface 20 in the preferred embodiment.

Figure 4:
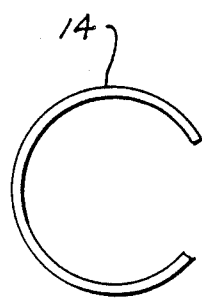
FIG. 4 is a side elevation view illustrating a retainer spring for the ball retainer.

Preferably, the spring 14 presses outward radially against the groove 36 with a force of about 20-30 pounds. This force is suitable to hold the spring 14 stationary in the groove 36 under normal conditions because the square corners of the spring 14 press out against the curved portion of the groove 36 to capture the spring in the groove. However, even with the spring 14 stationary, the retainer ring 16 can still move slightly back and forth in the axial direction because there is a small clearance between the spring 14 and the sides of the groove 26 for the spring 14 to be compressed into and expanded out of the groove 26. Also, the retainer ring 16 is not held firmly against shoulder 38 of the cavity 18 so that shoulder 38 does not restrain it against all axial movement. Preferably, as shown in FIG. 4, the spring 14 is of the type that has a gap between its ends so that it can be compressed. The spring 14 can be made from a hard drawn, oil tempered steel (e.g., HD spring steel).

The shoulder 38 faces outwardly in the axial direction and has a radially inward edge 38A and a radially outward edge 38B. The radially inward edge 38A intersects the spherical surface 20 at the end 25. The outward edge 38B intersects cylindrical surface 22a which engages the outer periphery of the ball retainer ring 16 with a clearance fit and has a groove 36 formed in it.

This construction assures a loose connection of the retainer 16 to the yoke 10. Firm seating of the retainer 16 against the ball 12 is undesirable because it increases friction between the retainer 16 and the ball 12 which results in excess heat and wear. Assembly of a ball retainer of the preferred embodiment is not possible unless the assembly results in a loose connection so that no preload on the ball 12 is possible with this connection. This is because, as the spring 14 drags on the surface 22a during insertion, the retainer 16 must be moved slightly past the position where the side 26c is in alignment with the shoulder 34 for the spring 14 to expand behind the shoulder 34. After the spring 14 expands behind the shoulder 34, the retainer 16 will be moved back in the direction opposite to that of insertion by the spring seating behind the shoulder 34. Thus, the retainer 16 must actually be pushed slightly beyond its final farthest-in position before the spring 14 will seat in the groove 36. Thus, firm seating against either the shoulder 38 or the ball 12 is prevented by this assembly.

As the spring 14 expands into groove 36, its radially outer corners cam on the round surfaces of groove 36 until it finds a static seated position. In this position, the spring is axially stationary without any play in its axial position. Thus, the looseness of the retainer connection is not determined by the clearance between the sides of the spring 14 and groove 36. Thereby, one manufacturing variable which could otherwise result in the connection being too loose is eliminated. Note, however, that when using a rounded groove 36, the spring 14 and the radius of the groove 36 must be chosen so that the spring is not cammed further into the ball receiving cavity than the position where the spring first began expanding into the second groove. Otherwise, a slight preload could conceivably be applied to the ball 12 by the retainer ring 16.

Although a spring 14 having a round cross section could be used, a spring 14 having a rectangular or square cross section is preferable for the disclosed embodiment. It has been found that a round cross section spring requires that its axial center line be precisely coaxial with the centers of the groove 36 and retainer 16. Otherwise, the retainer 16 can become jammed against the spring or even be removed from the circular opening 22. Also, if the groove 36 is slightly shallow, a round cross section spring can be pushed out of the groove 36.

Once installed, the retainer ring 16 cannot practically be removed. This helps prevent tampering with the ball joint which may otherwise cause a problem in the operation of the universal joint.

In some applications, it may be desirable to provide a retainer joint like that of the preferred embodiment but which applies a preload to the ball 12. This could be accomplished by providing a clearance between corner 14a and groove 36. Then, in expanding outwardly, corner 14b of spring 14 would cam along groove 36 and urge spring 14 and retainer ring 16 toward spherical surface 20. Of course, an appropriate clearance would also have to be provided between shoulder 38 and retainer ring 16 so that the camming action was stopped by the ring 16 abutting the ball 12, rather than by abutting the shoulder 38.

Dimensions which have been found suitable for the preferred embodiment are as follows: inside diameter, recess 22: 1.251"; outside diameter, ring 16: 1.249'; spring 14: 0.063" square; width of groove 26: 0.0675"; width of groove 36: 0.070"; ball 12 diameter: 0.998".

A low cost and effective ball retainer particularly adapted for a universal joint yoke has now been described. Many modifications and variations to the preferred embodiment will be apparent to those of ordinary skill in the art but which will still embody the invention. Therefore, it is not intended that the invention be limited by the scope of the drawings or the detailed description thereof, but only by the claims which follow.

I claim:

1. A ball retainer for the centering apparatus of a universal joint for a rotary drive line, comprising:
   a yoke having a ball receiving cavity at one end thereof;
   a first spherical surface formed in said ball receiving cavity, said spherical surface defining an axial direction and a radial direction in a plane normal to the axial direction and opening in its substantially largest dimension in the radial direction outwardly away from said yoke;
   a ball for being retained in said cavity and slidably mating with the first spherical surface;
   a ball retainer ring for keeping the ball in the cavity, said retainer ring having an inner end and an outer end;
   a second spherical surface on the ball retainer ring for mating with the ball when the ball is mating with the first spherical surface, said second spherical surface opening in its substantially largest dimension in the radial direction toward said yoke, said outer end of the ball retainer ring intersecting said second spherical surface at said substantially largest dimension in the radial direction of said second spherical surface; and
   a circular retainer spring for locking the retainer ring to the yoke;
   the ball receiving cavity having at one end an enlarged circular opening coaxial with the first spherical surface, said opening being defined by a first shoulder facing outwardly in the axial direction and having a radially inward edge and a radially outward edge, said radially inward edge intersecting the first spherical surface at said substantially largest dimension in the radial direction of said first spherical surface and said radially outward edge intersecting a cylindrical surface for engaging the outer periphery of the ball retainer ring with a clearance, said cylindrical surface having a groove formed therein which defines a second shoulder facing in the axial direction toward the first spherical surface;
   the ball retainer ring having a groove around its outside circumference to receive the retainer spring, said groove having a side facing in the axial direction toward the first spherical surface, said ball retainer ring being insertable into said circular opening with said side of said groove passing beyond the axial position of the second shoulder of the circular opening and said groove allowing the retainer spring to be substantially fully compressed into said groove;
   wherein the retainer spring is compressed into the groove in the retainer ring to insert the retainer ring into the circular opening, and expands behind the second shoulder after the retainer ring is inserted past the position where the side of the groove is aligned with the second shoulder of the ball receiving cavity when said retainer spring clears said shoulder so that the retainer ring locks the ball in the ball receiving cavity between the first and second spherical surfaces with a space between the first shoulder and the inner end of the ball retainer ring, a loose sliding fit between the ball and the ball receiving cavity and with the retainer ring freely rotatable in the circular opening.

2. A ball retainer as in claim 1, wherein the retainer spring has a rectangular cross section.

3. A ball retainer as in claim 2, wherein the retainer spring has a square cross section.

4. A ball retainer as in claim 1, wherein the groove in the cylindrical surface of the ball receiving cavity has a semi-round cross section.

5. A ball retainer as in claim 4, wherein the retainer spring is rectangular in cross section and the radially outer corners of the retainer spring abut round surfaces of the groove in the cylindrical surface of the ball receiving cavity.

6. A ball retainer as in claim 5, wherein the retainer spring exerts a radially outward force against the groove in the cylindrical surface of the ball receiving cavity.

7. A ball retainer as in claim 4, wherein the groove in the retainer ring has a rectangular cross section.

8. A ball retainer as in claim 1, wherein the groove in the retainer ring has a rectangular cross section.

9. A ball retainer as in claim 1, wherein the retainer spring exerts a radially outward force on the yoke.

* * * * *